Sept. 15, 1959     S. W. FERRIS     2,904,495
PROCESS FOR THE RECOVERY OF SOLIDS FROM LIQUIDS
BY MEANS OF ENDLESS BELT ABSORPTION
Filed Dec. 30, 1955

INVENTOR.
SEYMOUR W. FERRIS

ATTORNEY

United States Patent Office 2,904,495
Patented Sept. 15, 1959

2,904,495

PROCESS FOR THE RECOVERY OF SOLIDS FROM LIQUIDS BY MEANS OF ENDLESS BELT ABSORPTION

Seymour W. Ferris, Mount Holly, N.J., assignor to Sun Oil Company, Philadelphia, Pa., a corporation of New Jersey Application December 30, 1955, Serial No. 556,539

8 Claims. (Cl. 208—26)

This invention relates to the separation of solids and liquids, and is more particularly directed to the separation of solids crystallized from a solution thereof.

Many processes chemical in nature require the separation of solids from liquids. Mixtures of solids and liquids have heretofore been separated by methods such as decanting, filtering and centrifuging. Such processes, however, are not entirely satisfactory in one or more respects, e.g. in the length of time required for settling so that decanting can be used, in the building up of filter cakes which retards filtration, and by requiring expensive and complicated equipment necessary for centrifuging.

An object of the present invention is to provide a simple and rapid process for the separation of solids from liquids. Another object is to provide a process for the separation of solids crystallized from a solution thereof. A particular object of the invention is to provide a process for the separation of wax from oil. Other objects and their achievement in accordance with the invention appear hereinafter.

It has now been found that by flowing an admixture of a crystalline solid with a liquid on the upper surface of a thin layer of a spongy material whose lower surface is maintained in contact with a thick layer of a spongy material, the crystalline solid remains on the thin layer while a major proportion of the liquid passes through the thin layer and is absorbed in the thick layer. The thick layer of spongy material is then separated from the thin layer and the liquid recovered from the separated thick layer. The crystalline solid is recoverable from the separated thin layer.

Figure 1:
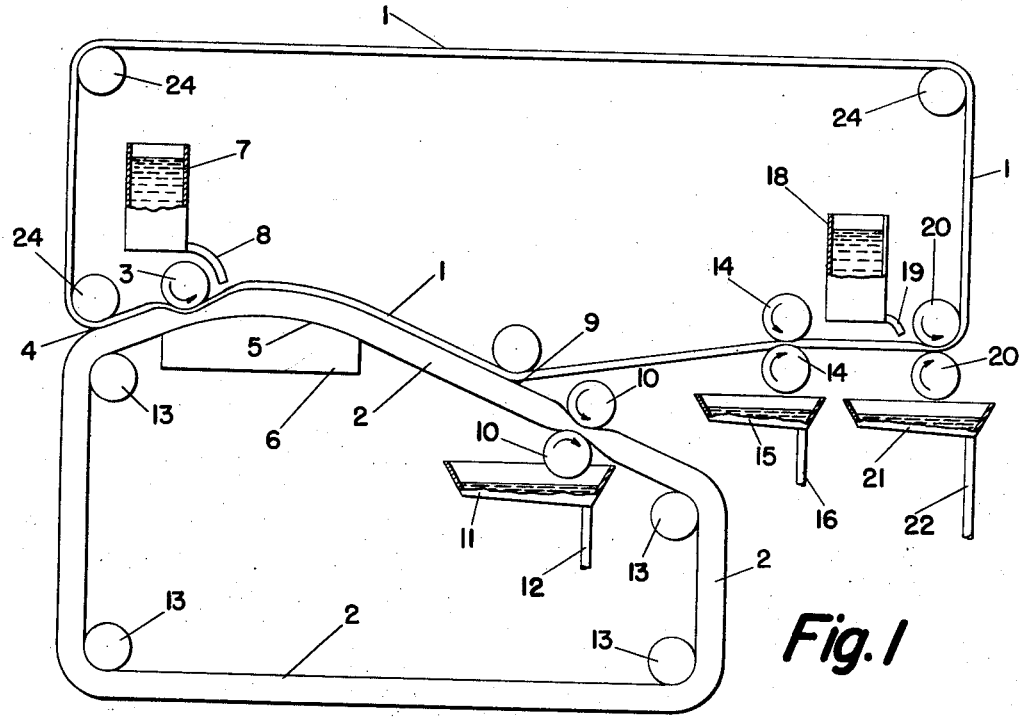
Figure 2:
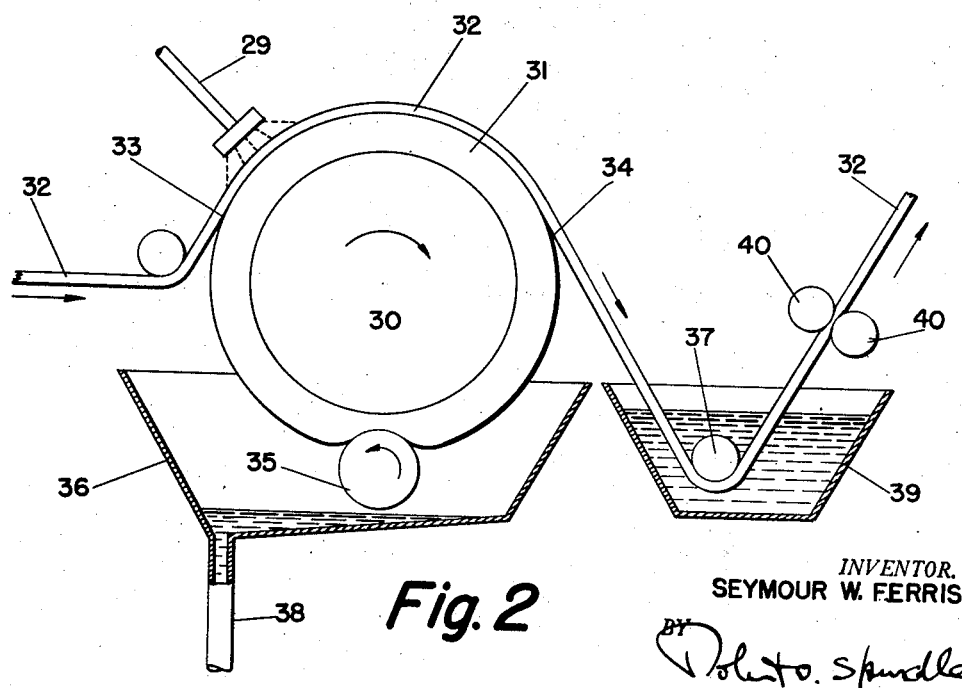

Figures 1 and 2 are elevation views showing embodiments of the invention; both figures are discussed hereinafter.

The process of the invention is especially applicable for the separation of wax from oil and hence the following discussion is directed primarily thereto, but the process of the invention is limited only as hereinafter indicated.

Attention is now directed to Figure 1. Numeral 1 represents a thin layer or sheet of spongy material constructed as an endless belt. Numeral 2 represents a thick layer or sheet of the same material also constructed as an endless belt. Layers 1 and 2 are contacted at 4 and move, in contact with each other, over supporting structure 6 having curved face 5 to insure good contact between layers 1 and 2. A mixture of oil and wax crystals is continuously flowed onto the surface of thin layer 1 from container 7 as shown at 8. Roller 3 is advantageously used to compress the belts immediately prior to the application of the wax-oil mixture so that subsequent expansion of the belts assists entry of the oil into the belts. Structure 6 prevents the entry of any substantial quantity of air into the belts through the lower surface thereof, thereby further assisting entry of the oil. If desired, structure 6 can be provided with sides (not shown) which contact the sides of the belt to prevent entry of air therethrough. During the application of the oil-wax mixture, layers 1 and 2 move continuously, at the same rate of speed and in contact with each other, in the direction of solid and liquid recovery as hereinafter described. Layers 1 and 2 are separated at 9. Prior to separation, the layers should have been in contact long enough for a major portion of the oil to be absorbed into the thick layer. Thick layer 2 is then passed through rollers 10 which squeeze oil therefrom. The oil falls into receptacle 11 and is recovered through conduit 12. After removal of oil therefrom, layer 2 is ready for re-use and is returned to the process, the layer being advantageously in the form of an endless belt which continuously moves through the several steps of the process, as shown. Supporting members or rollers 13 are provided as needed or desired to assist layer 2 in moving through the process. Layer 1, after separation from layer 2 at 9, is processed to remove oil and wax therefrom. This is advantageously accomplished by passing layer 1 through rollers 14, which squeeze oil therefrom, the oil falling into receptacle 15 and is recovered through conduit 16. A solvent for the wax, such as petroleum naphtha, benzene, trichlorethylene, carbon tetrachloride, or mixtures thereof, which is preferably heated to an elevated temperature, is then continuously applied to layer 1 from container 18 as shown at 19. Wax is thereby dissolved, and the solution is removed from layer 1 by passage through rollers 20. The solution falls into receptacle 21 and is recovered through conduit 22. Wax can be recovered from the solution, such as by distillation, and the solvent returned to container 18 for re-use. Layer 1 is then ready for re-use and is returned to the process. Supporting members or rollers 24 are provided as needed or desired to assist layer 1 in moving through the process. Oil from receptacle 15, which may be admixed with wax, is recovered through conduit 16 and can be returned to the process or otherwise used.

Because of the difference in thickness between layers 1 and 2, a major proportion of the oil is absorbed in layer 2 whereas only a minor proportion remains in layer 1. All of the crystalline wax, however, remains on and is removed by layer 1. Hence the oil collected in receptacle 11 is free from wax which crystallizes at the temperature of the separation.

Attention is now directed to Figure 2 which illustrates another embodiment of the invention.

Numeral 30 indicates a revolving drum having a thick layer of spongy material 31 around the periphery thereof. A thin layer of spongy material 32 contacts thick layer 31, such as shown at 33, prior to the application of a wax-oil mixture thereto as shown by spray 29. Drum 30 revolves as spongy material 32 passes thereover. After the wax-oil mixture is flowed on the surface of layer 32 from sprayer 29, layer 32 remains in contact with thick layer 31 until separated as shown at 34. This permits sufficient time for a major proportion of the oil to pass through layer 32 and be absorbed in layer 31. As drum 30 continues rotating, roller 35 presses oil from thick layer 31. The oil drops into receptacle 36 and is recovered through conduit 38. Wax is recovered from 32 by any convenient means, such as by passing through solvent bath 39. Supporting member 37, which is advantageously a roller, is provided for convenience. Rollers 40 provide for removing solvent from layer 32. Thin layer 32 is advantageously an endless belt and after leaving bath 39 and passage through rollers 40, is returned for additional contacting with thick layer 31 and application of the wax-oil mixture thereto. In operation, drum 30 continuously revolves. Spongy material 32 continuously passes over drum 30 in contact with thick layer 31, and travels at the same rate of speed at which drum 30 revolves. Recovery of the minor proportion of oil contained in layer 32, can be accomplished by squeezing with rollers prior to introduction into the solvent bath, or it can be removed, together with wax, in the solvent bath. Wax and oil can be recovered from the solvent such as by distillation. Recovered solvent is advantageously returned to the solvent bath.

The wax-oil mixtures separated as above described can be from any source. Cooling a petroleum waxy distillate or residuum fraction to precipitate wax crystals gives excellent results. In some instances, such as where the cooled mixture is relatively viscous, a diluent such as a low boiling range petroleum naphtha, benzene, methylethylketone, toluene, mixtures thereof, and the like, can advantageously be used. It is also advantageous, in some instances to operate the portion of the process prior to the separation of layers in a cold room to assist in maintaining the wax in solid form. In general, it is desirable to have both layers wet with a liquid the same as, or similar to, the liquid of the solid-liquid mixture at the time of application of the mixture since the time required for absorption is thereby decreased. This condition is usually met by recycling the belts, which are wet with a small amount of liquid remaining therein after recovery of the liquid and solid, to the process.

Other embodiments of the process of the invention will be apparent to those skilled in the art. It is essential, in all embodiments of the process of the invention, that two layers of spongy sheet material be employed. By "spongy material," as used herein, is meant a material which readily absorbs liquids and which is resilient, i.e., after the sheet material has been compressed, it returns to its original shape on release of the pressure. Especially suitable spongy materials are foamed synthetic resins, such as foamed polyurethane or foamed polyvinylchloride. Other spongy materials may be used with good results, such as natural or synthetic foam rubber, and certain fabrics such as wool. It is essential that the interstices of the spongy material be sufficiently small to keep the crystals of solid material being separated from liquid on or near the surface of the thin layer, i.e. the solid material must not pass through the thin layer and be absorbed into the thick layer. The spongy material must also not be deleteriously affected by the materials which contact it in the process. It is preferred to have the two layers of spongy material prepared from the same material, such as foamed polyurethane, and the layers can have the same or different porosities. However, in some instances the thin layer may be a material different than the material of the thick layer. For example, a thin layer of foam rubber used with a thick layer of foamed polyurethane gives good results in some instances.

The dimensions of the spongy sheet materials will depend upon the particular application of the process. Preferably both layers are constructed as endless belts. The thin endless belt, or layer, is advantageously from 1/16 to 4 inches thick, and preferably is from 1/8 to 1 inch thick for most applications. The thick endless belt, or layer, is advantageously from 1/2 to 40 inches thick, and preferably is from 1 to 12 inches thick in most instances. The thick layer should be at least 2 times the thickness, and preferably at least 4 times the thickness, of the thin layer to obtain good results. The width of the endless belts is determined by convenience, and advantageously is from 1 to 12 feet for most applications, the width of both layers being substantially the same. Although it is preferred to have both layers in the form of an endless belt, as above described, the layers can be supplied to the process and thereafter stored or collected, such as in rolls, and then re-used in the process. The dimensions of the layers, the rate of application on the wax-oil mixture thereto, and the length of time the layers are maintained in contact after such application should be correlated to obtain optimum results.

Oil is recovered after separation of the thin from the thick layer by pressing the thick layer. This is advantageously accomplished by pressing with rollers or a series of rollers. Because of the resiliency of the thick layer, after pressing, it returns to substantially its initial shape and is immediately ready for re-use in the process. Wax removal from the thin layer is advantageously accomplished by dissolution thereof in a solvent as above described. Suitable solvents include, for example, petroleum naphtha, benzene, trichlorethylene, carbon tetrachloride, mixtures thereof, and the like. However it is important that the spongy material be substantially unaffected by contact with the solvent used. The wax is readily recovered from the solvent by distilling the solvent therefrom. Wax may also be removed from a thin layer by passage through hot water, in which event the wax is skimmed from the surface of the hot water. Other means of recovery, such as by blowing with air, or by means of a doctor blade, can be used in some instances with good results.

The following examples illustrate embodiments of the invention. In the examples, the charge stock was a waxy petroleum distillate having a boiling range of from about 690° F. to 860° F. The micro-solid point of the charge stock was 69° F. By "micro-solid point" is meant the highest temperature at which the material in question will not pour, which is indicative of the wax content of the material, i.e., a high micro-solid point shows a high wax content. In the examples, two layers of foamed polyurethane were used. The upper layer was 1/8 inch thick and the lower layer 1 inch thick and in each instance the wax-oil mixture was flowed onto the upper layer while the upper and lower layers were in contact. In the examples, "parts" refers to parts by volume unless otherwise stated.

*Example 1*

The waxy distillate oil charge stock at a temperature of 82° F. was flowed onto the polyurethane surface at a rate of 1.28 liters per square foot of polyurethane surface area in 30 minutes, i.e. the liquid portion of the charge stock was substantially completely absorbed through a square foot of the polyurethane surface in 30 minutes. The polyurethane at the time of contacting with the charge stock was dry. After the absorption by the polyurethane, the upper layer was separated from the lower layer. From the upper layer there were recovered 205 parts of wax and 179 parts of oil. From the lower layer there were recovered 770 parts of oil free from wax which is solid at the temperature of the separation. A relatively small quantity of oil was retained by both layers. The micro-solid point of the wax was 80° F., of the oil separated from the upper layer 69° F., and of the oil separated from the lower layer 63° F. The wax recovered is suitable for further processing to prepare wax products and the recovered oil can be dewaxed at a lower temperature for preparing a low pour point oil, or otherwise further processed as desired.

*Example 2*

Two parts of the waxy oil distillate charge stock was admixed with one part of a light petroleum naphtha to prepare the charge stock of the example. The charge stock at a temperature of 44° F. was flowed onto the polyurethane surface at a rate of 1.6 liters of the charge stock per square foot of polyurethane surface area in 5 minutes. The polyurethane, at the time of application was wet with a mixture of naphtha and oil. After absorption of the charge stock into the polyurethane, the upper layer was separated from the lower layer. 865 parts of the charge stock remained in the upper layer of which about 63% was wax and 37% naphtha. Oil and naphtha was recovered from the lower layer and was free from wax which crystallizes therein at a temperature of 44° F. and above.

*Example 3*

The waxy oil distillate charge stock at a temperature of 73° F. was flowed onto the polyurethane surface at a rate of 0.8 liter per square foot of surface area of the polyurethane in 12 minutes. The polyurethane was dry at the time of application. After absorption of the charge stock the upper layer of polyurethane was separated from the lower layer. From the upper layer there were recovered 176 parts of wax and 144 parts of oil. From the lower layer there were recovered 208 parts of oil, the remaining oil being left in the polyurethane so that it would be wet for the next run.

The next run was performed with the wet polyurethane. The same conditions as above stated were used. It was found that the rate of absorption was increased about 33%. After absorption of the oil, the two polyurethane layers were separated. From the upper layer there were recovered 224 parts of wax and 128 parts of oil, the remaining oil was in the lower layer and free from wax which crystallizes from the charge stock at the temperature of the separation.

*Example 4*

The procedure of Example 1 was substantially repeated using a charge stock consisting of the waxy distillate oil and an equal volume of petroleum spirits. The charge stock at a temperature of about 48° F. was flowed onto the polyurethane surface at a rate of 0.8 liter of the charge stock per square foot of polyurethane surface area in 9.5 minutes. On separation of the layers, 288 parts of a mixture of wax and oil having a micro-solid point of 60 were recovered from the upper layer. 416 parts of oil having a micro-solid point of 32 were recovered from the lower layer.

This procedure was repeated, a light gas oil being substituted for the petroleum spirits. The temperature of the separation was about 74° F. and the charge stock was applied at a rate of 1.6 liters per square foot of polyurethane surface area in 1.25 minutes. Upon separation of the layers, 176 parts of a mixture of waxy oil and light gas oil having a micro-solid point of 69 were recovered from the upper layer. 1220 parts of a mixture of oil and light gas oil were recovered from the lower layer, this mixture being free from wax which precipitates from the charge stock at the temperature of the separation.

The process of the invention has been largely described in terms of separating wax and oil, but other solids can be separated from liquids with good results. For example, naphthalene can be separated from homologues thereof such as the methylnaphthalenes and ethylnaphthalenes by cooling to crystallize naphthalene and separating the solid naphthalene from the liquid as above described, and a toluic acid, such as o-toluic acid, or a mixture of toluic acids, can be separated from a xylene such as m-xylene or from a mixture of xylenes in accordance with the process.

The invention claimed is:

1. Process for separating solids from liquids which comprises flowing an admixture of a solid and liquid onto the upper surface of a thin layer of spongy sheet material, the lower surface of said thin layer being in contact with the upper surface of a thick layer of spongy sheet material, whereby a major proportion of the liquid flows through said thin layer and is absorbed in said thick layer and the solid remains on said thin layer, and separating the thin layer containing the solid from the thick layer containing a major proportion of the liquid, and recovering at least a portion of the liquid from the thick layer.

2. Process for separating solids from liquids which comprises flowing an admixture of a solid and liquid onto the upper surface of a thin layer of spongy sheet material, the lower surface of said thin layer being in contact with the upper surface of a thick layer of spongy sheet material, whereby a major proportion of the liquid flows through said thin layer and is absorbed in said thick layer and the solid remains on said thin layer, and separating the thin layer containing the solid from the thick layer containing a major proportion of the liquid, recovering at least a portion of the liquid from the thick layer, and recovering at least a portion of the solid from the thin layer.

3. Process according to claim 2 wherein the spongy sheet material is foamed polyurethane.

4. Process according to claim 2 wherein the spongy sheet material is foamed polyvinylchloride.

5. Process for separating wax from oil which comprises flowing a mixture of oil and solidified wax onto the upper surface of a thin layer of an absorbent material, said thin layer being in contact with a thick layer of the absorbent material, whereby a major proportion of the oil flows through said thin layer and into said thick layer while the solidified wax remains substantially on the surface of said thin layer, separating said thin layer containing solidified wax from said thick containing a major proportion of the oil, and recovering oil from said thick layer.

6. Process for separating wax from oil which comprises continuously flowing an admixture of crystallized wax and oil onto the upper surface of a moving thin spongy endless belt, the bottom surface of said thin spongy endless belt being in contact with the upper surface of a moving thick spongy endless belt, maintaining the thin and thick endless belts in contact while moving at the same rate of speed whereby oil passes through the thin belt and is absorbed into the thick belt, separating the thin belt from the thick belt, pressing the thick belt to recover at least a portion of oil therefrom, and recovering at least a portion of the wax from the thin belt.

7. Process according to claim 6 wherein the thin endless belt and the thick endless belt are foamed polyurethane.

8. Process according to claim 6 wherein the thin endless belt and the thick endless belt are foamed polyvinylchloride.

References Cited in the file of this patent

UNITED STATES PATENTS

| | | |
|---|---|---|
| 1,180,599 | Murphy | Apr. 25, 1916 |
| 1,876,399 | Catala et al. | Sept. 6, 1932 |
| 1,958,279 | Morgan | May 8, 1934 |
| 2,194,185 | Padgett | Mar. 19, 1940 |
| 2,658,855 | Payne | Nov. 10, 1953 |
| 2,678,132 | Beard | May 11, 1954 |
| 2,713,022 | Dole et al. | July 12, 1955 |